(12) United States Patent
Hu et al.

(10) Patent No.: US 11,002,750 B2
(45) Date of Patent: May 11, 2021

(54) METHOD AND APPARATUS FOR ELECTRONIC DETECTION AND DETERMINATION

(71) Applicant: Guangzhou Wondfo Biotech Co., Ltd., Guangzhou (CN)

(72) Inventors: Haisheng Hu, Guangzhou (CN); Zanxun Cen, Guangzhou (CN); Guiyang Li, Guangzhou (CN); Hong Luo, Guangzhou (CN); Jihua Wang, Guangzhou (CN)

(73) Assignee: Guangzhou Wondfo Biotech. Co., Ltd.

( * ) Notice: Subject to any disclaimer, the term of this patent is extended or adjusted under 35 U.S.C. 154(b) by 742 days.

(21) Appl. No.: 15/322,846

(22) PCT Filed: May 11, 2015

(86) PCT No.: PCT/CN2015/078664
§ 371 (c)(1),
(2) Date: Dec. 29, 2016

(87) PCT Pub. No.: WO2016/000490
PCT Pub. Date: Jan. 7, 2016

(65) Prior Publication Data
US 2017/0363652 A1  Dec. 21, 2017

(30) Foreign Application Priority Data
Jul. 2, 2014 (CN) .......................... 201410314877.8

(51) Int. Cl.
*G01N 33/48* (2006.01)
*G01N 35/00* (2006.01)
*G01N 21/84* (2006.01)

(52) U.S. Cl.
CPC . *G01N 35/00712* (2013.01); *G01N 35/00584* (2013.01); *G01N 21/8483* (2013.01);
(Continued)

(58) Field of Classification Search
None
See application file for complete search history.

(56) References Cited

U.S. PATENT DOCUMENTS

| 4,523,279 A | 6/1985 | Sperinde et al. |
|---|---|---|
| 5,162,234 A | 11/1992 | Tanaka et al. |
| (Continued) | | |

FOREIGN PATENT DOCUMENTS

| CN | 102162790 | 8/2011 |
|---|---|---|
| CN | 102384890 | 3/2012 |
| (Continued) | | |

OTHER PUBLICATIONS

Mao et al. "Rapid quantitative immunochromatographic strip for multiple proteins test," Science vol. 186 (2013) pp. 315-320.*
(Continued)

*Primary Examiner* — Anna Skibinsky
(74) *Attorney, Agent, or Firm* — Lerner, David, Littenberg, Krumholz & Mentlik, LLP

(57) ABSTRACT

Method and apparatus for electronic detection and determination includes detecting a signal T0 in a detection zone and a signal R0 in a reference zone before a sample is added; adding a sample and detecting the signals in each of the detection zone and the reference zone at an interval of a second preset period; calculating a judgement value based on 2k immediately previous signals in each of the detection zone and the reference zone, the signal T0 in the detection zone before the sample is added, and the signal R0 in the reference zone before the sample is added, each time when k successive signals are detected in each of the detection zone and the reference zone; and determining a judgement result based on m successive judgement values and a preset result threshold corresponding to a current detection time.

15 Claims, 4 Drawing Sheets

(52) U.S. Cl.
CPC ............... *G01N 2021/8488* (2013.01); *G01N 2035/0097* (2013.01); *G01N 2035/00891* (2013.01)

(56) References Cited

U.S. PATENT DOCUMENTS

| | | | | |
|---|---|---|---|---|
| 5,212,060 | A | * | 5/1993 | Maddox ................ B01L 3/5023 422/401 |
| 5,889,585 | A | | 3/1999 | Markart |
| 2006/0024835 | A1 | * | 2/2006 | Matzinger ............ G01N 33/558 436/95 |
| 2009/0011444 | A1 | * | 1/2009 | Chen ........................ A61P 19/02 435/7.92 |
| 2009/0061534 | A1 | * | 3/2009 | Sharrock ............... G01N 33/545 436/518 |
| 2011/0184651 | A1 | | 7/2011 | Weng et al. |
| 2013/0137121 | A1 | | 5/2013 | Wang et al. |
| 2013/0149776 | A1 | | 6/2013 | Sharrock et al. |
| 2015/0204782 | A1 | | 7/2015 | Wang et al. |
| 2017/0363652 | A1 | | 12/2017 | Hu et al. |

FOREIGN PATENT DOCUMENTS

| | | |
|---|---|---|
| CN | 102928607 | 2/2013 |
| CN | 104062449 A | 9/2014 |
| EP | 2128604 A1 | 12/2009 |
| JP | S626145 A | 1/1987 |

OTHER PUBLICATIONS

G.-P. Zhang et al., "Development and evaluation of an immunochromatographic strip for trichinellosis detection," Veterinary Parasitology 137 (2006) 286-293.*
Chinese Search Report for Chinese Patent Application No. 201410314877.8, dated Apr. 28, 2015.
International Search Report for Application No. PCT/CN2015/078664, dated Jul. 29, 2015.
Extended European Search Report including Written Opinion for EP15815768.5 dated Jan. 5, 2018.

* cited by examiner

METHOD AND APPARATUS FOR ELECTRONIC DETECTION AND DETERMINATION

CROSS REFERENCE TO RELATED APPLICATIONS

The present application is a national phase entry under 35 U.S.C. § 371 of International Application No. PCT/CN2015/078664, filed May 11, 2015, which claims priority from Chinese Patent Application No. 201410314877.8, filed Jul. 2, 2014, all of which are hereby incorporated herein by reference.

TECHNICAL FIELD

The present disclosure relates to the field of determination of assay results, and more particularly, to a method and an apparatus for electronic detection and determination.

BACKGROUND

Conventional electronic analyzer for analyzing analyte, such as an electronic pregnancy test, usually involves inserting a test strip, such as a colloidal-gold-labeled immunochromatographic test strip, into an electronic analyzer and adding a sample to be analyzed to the strip. Once a preset detection time elapses, the electronic analyzer scans a detection zone, a quality-control zone, and a reference zone on the test strip and performs analysis and calculation according to a preset program, the results of which are output for a user. Such an electronic analyzer provides assay results by detection of a detection zone and a reference zone and automatic analysis of the detection results, thereby preventing human errors in manual judgement. Current electronic analyzers typically only perform analytical determination for once before outputting the results, such as, in a determination approach using the assay determination apparatus as disclosed in CN 102384890. Colloidal gold flows downwards with the sample during the chromatographic process of the test strip, and remains in a state of free mobility before captured by a coating at the quality-control line and the detection line at completion of the reaction. An electronic analyzer performs analytical determination in accordance with the aggregation and color development of the colloidal gold on the strip. Before the chromatographic process finally stabilizes, the colloidal gold is still mobile on the test strip. While a preset reaction time, after the elapse of which the electronic analyzer performs detection, analysis, and result determination, is a generalized value, variation may exist among individual test strips due to their materials, coating, and subtle differences in the manufacturing processes, which may potentially render small deviations in the time for reaction result to stabilize. As a result, if the electronic analyzer initiates reading before the stabilization of the sample reaction on the test strip, errors or even misjudgment may occur in the assay results that mislead the user.

SUMMARY OF THE INVENTION

In view of the above, one aspect of the present disclosure provides a method and an apparatus for electronic detection and determination, which may improve the accuracy of electronic analytical determination and thus overcome or at least alleviate the deficiency discussed above.

To achieve at least the above goals, embodiments of the present disclosure provide the following technical solutions.

A method for electronic detection and determination comprises the following steps:

detecting a signal T0 in a detection zone and a signal R0 in a reference zone before a sample is added;

adding a sample and detecting the signal in each of the detection zone and the reference zone at an interval of a second preset period;

calculating a judgement value based on a number of the immediately previous signals in each of the detection zone and the reference zone, the signal T0 in the detection zone before the sample is added, and the signal R0 in the reference zone before the sample is added, each time when a number of successive signals are detected in each of the detection zone and the reference zone, the number of successive detections being k and the number of the immediately previous signals being 2k; and determining a judgement result based on a number of successive judgement values and a preset result threshold corresponding to a current detection time, the number of successive judgement values being m.

Apparatus for electronic detection and determination comprises:

a control unit, configured to control a detection-zone detection unit to detect a signal T0 in a detection zone and control a reference-zone detection unit to detect a signal R0 in a reference zone before a sample is added, and configured to control the detection-zone detection unit to detect the signal in the detection zone and control the reference-zone detection unit to detect the signal in the reference zone at an interval of a second preset period after the sample is added is detected;

a judgement value calculation unit, configured to calculate a judgement value based on a number of the immediately previous signals in each of the detection zone and the reference zone, the signal T0 in the detection zone before the sample is added, and the signal R0 in the reference zone before the sample is added, each time when a number of successive signals are detected in each of the detection zone and the reference zone, the number of successive detections being k and the number of the immediately previous signals being 2k; and a judgement result determination unit, configured to determine a judgement result based on a number of successive judgement values and a preset result threshold corresponding to a current detection time, the number of successive judgement values being m.

The embodiments of the present disclosure as above takes into account potential unstable factors during the reaction process of a test strip, such as light intensity, electric voltage, mobility of colloidal gold during chromatographic process, and provides a determination result by performing determination for multiple times after a sample is successfully added, ensuring the accuracy of the results and improving the accuracy of electronic analytical determination.

DETAILED DESCRIPTION OF EMBODIMENTS

To better reveal the purpose, technical solution, and advantage of the disclosure, detailed description is provided below with reference to figures and embodiments. It should be understood that the specific exemplary embodiments are also described for the purpose of illustrating the present disclosure, without limiting the scope of the disclosure in any aspect.

Figure 1:
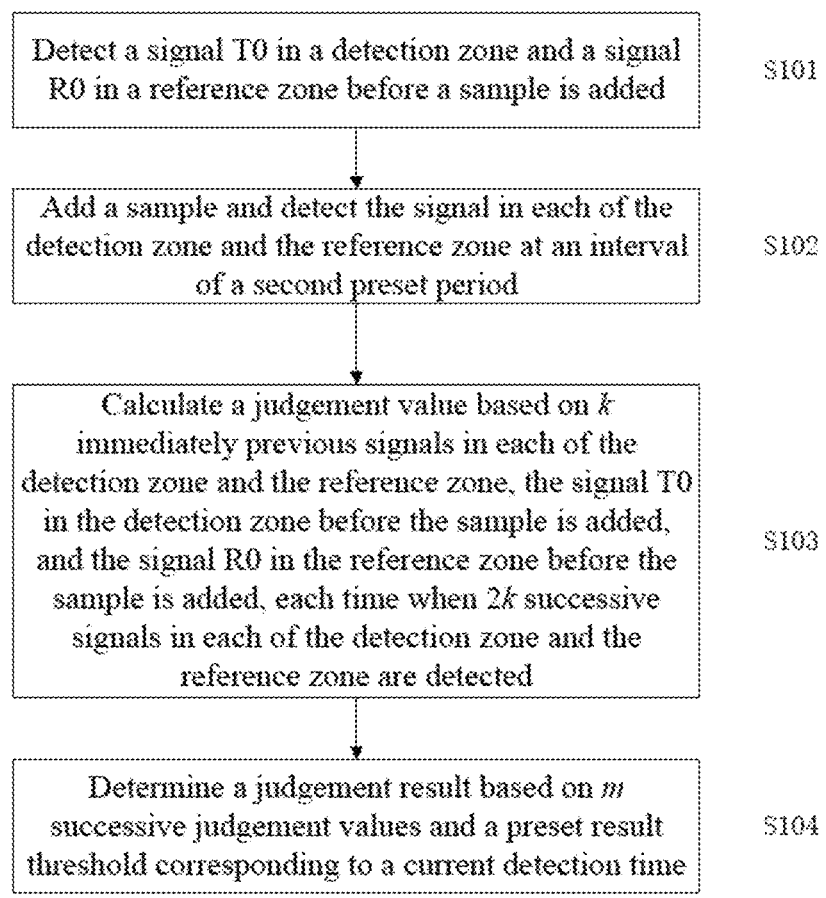
FIG. 1 schematically shows a flow chart of the process for electronic detection and determination according to a first example embodiment of the present disclosure.

FIG. 1 schematically shows a flow chart of the process for electronic detection and determination according to a first example embodiment of the present disclosure. As shown in FIG. 1, the method according to this embodiment comprises:

Step S101: detecting a signal T0 in a detection zone and a signal R0 in a reference zone before a sample is added;

Step S102: adding a sample and detecting the signal in each of the detection zone and the reference zone at an interval of a second preset period;

Step S103: calculating a judgement value based on 2k immediately previous signals in each of the detection zone and the reference zone, the signal T0 in the detection zone before the sample is added, and the signal R0 in the reference zone before the sample is added, each time when k successive signals are detected in each of the detection zone and the reference zone; and Step S104: determining a judgement result based on m successive judgement values and a preset result threshold corresponding to a current detection time.

The embodiments of the present disclosure as above takes into account potential unstable factors during the reaction process of a test strip, such as light intensity, electric voltage, mobility of colloidal gold during chromatographic process, and provides a determination result by performing determination for multiple times after a sample is successfully added, ensuring the accuracy of the results and improving the accuracy of electronic analytical determination.

Figure 2:
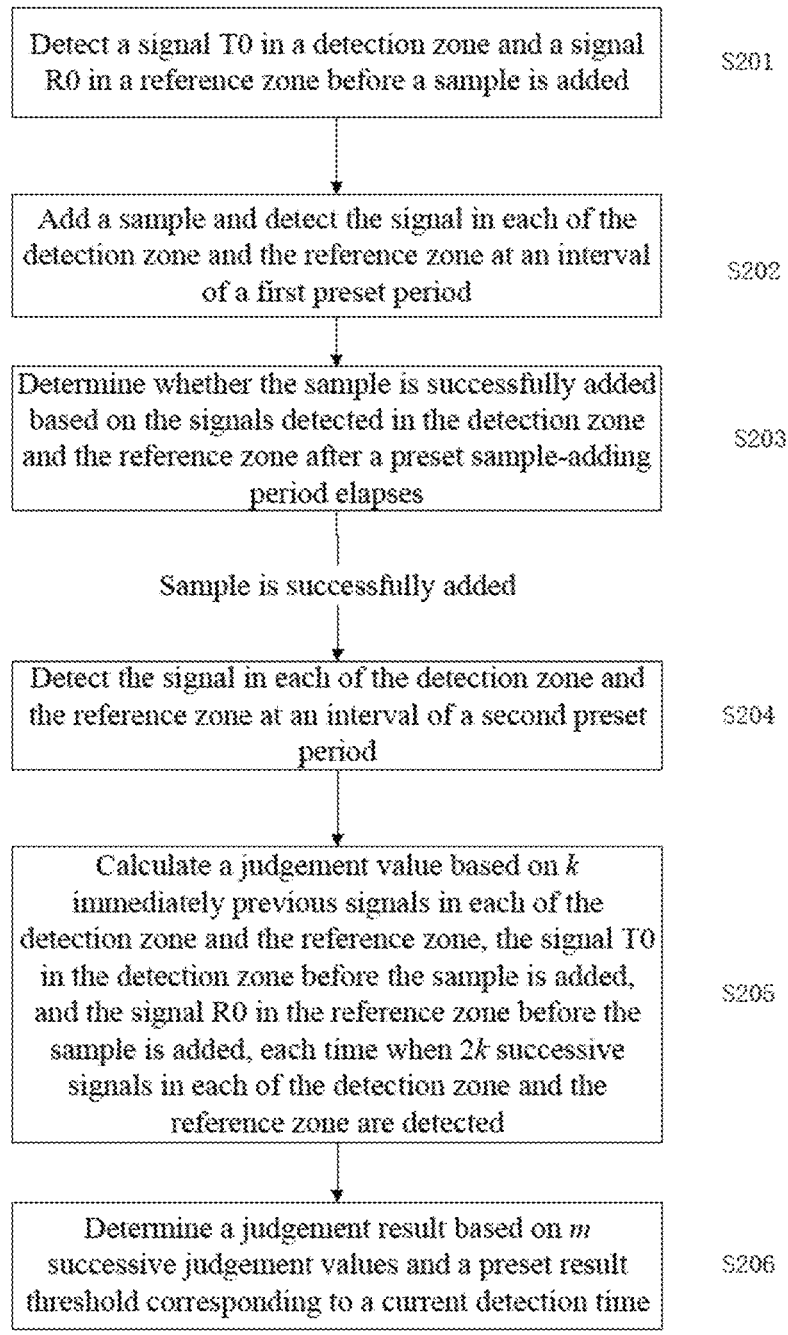
FIG. 2 schematically shows a flow chart of the process for electronic detection and determination according to a second example embodiment of the present disclosure.

FIG. 2 schematically shows a flow chart of the process for electronic detection and determination according to a second example embodiment of the present disclosure. The primary difference distinguishing this embodiment from the first embodiment lies in that, in this embodiment, the process proceeds to the subsequent determination process only after determining that a sample has been successfully added.

As shown in FIG. 2, the method according to this embodiment comprises:

Step S201: detecting a signal T0 in a detection zone and a signal R0 in a reference zone before a sample is added;

Step S202: adding a sample and detecting the signal in the detection zone and the signal in the reference zone at an interval of a first preset period;

Step S203: determining whether the sample is successfully added based on the signals detected in the detection zone and the reference zone after a preset sample-adding period elapses, and, if the sample is successfully added, entering S204;

Step S204: detecting the signal in each of the detection zone and the reference zone at an interval of a second preset period;

Step S205: calculating a judgement value based on 2k immediately previous signals in each of the detection zone and the reference zone, the signal T0 in the detection zone before the sample is added, and the signal R0 in the reference zone before the sample is added, each time when k successive signals are detected in each of the detection zone and the reference zone; and Step S206: determining a judgement result based on m successive judgement values and a preset result threshold corresponding to a current detection time.

In Step S203 above, the judgment of whether the sample is successfully added may be made as follows:

determining whether a difference between a maximum value and a minimum value of the signals in the detection zone detected during the preset sample-adding period is greater than or equal to a preset detection-zone threshold;

determining whether a difference between a maximum value and a minimum value of the signals in the reference zone detected during the preset sample-adding period is greater than or equal to a preset reference-zone threshold; and determining that the sample is successfully added if both judgement results above are determined to be true.

Accordingly, if either of the judgement results above is determined to be false, i.e., if a difference between a maximum value and a minimum value of the signals in the detection zone detected during the preset sample-adding period is smaller than a preset detection-zone threshold, or if a difference between a maximum value and a minimum value of the signals in the reference zone detected during the preset sample-adding period is smaller than a preset reference-zone threshold, then it is determined that the sample is not successfully added and an alert is given to indicate the same.

Further, in one of the embodiments, the judgement value may be calculated in Step S103 or Step S205 with the following equation:

$$P_i = \sum_{n=i*k+1}^{(i+1)*k} \frac{Rn}{R0} \bigg/ \frac{Tn}{T0} - \sum_{n=(i-1)*k+1}^{i*k} \frac{Rn}{R0} \bigg/ \frac{Tn}{T0} \qquad (1)$$

whereas Pi represents the judgement value, i represents an $i^{th}$ set consisting of k signals from each of the detection zone and the reference zone, Rn represents an $n^{th}$ signal from the reference zone, and Tn represents an $n^{th}$ signal from the detection zone.

In another embodiment, the judgement value may also be calculated in Step S103 or Step S205 with the following equation:

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right) \qquad (2)$$

whereas Pi represents the judgement value, i represents an $i^{th}$ set consisting of k signals from each of the detection zone and the reference zone, Rn represents an $n^{th}$ signal from the reference zone, and Tn represents an $n^{th}$ signal from the detection zone.

When the judgement value Pi is obtained, a judgement result is determined based on m successive judgement values and a preset result threshold corresponding to a current detection time. In one of the embodiments, the process may perform one of the following steps for this purpose:

outputting a first judgement result corresponding to the first corresponding result threshold, if the m successive judgement values are all smaller than the first corresponding result threshold;

outputting a second judgement result corresponding to the second corresponding result threshold, if the m successive judgement values are all greater than the second corresponding result threshold; and outputting a preset judgement result if at least one of the m successive judgement values is greater than the first corresponding result threshold but smaller than the second corresponding result threshold.

The preset judgement result herein may be either one of the first and second judgement results, or a third judgment result that is neither of the first and second judgement results, which is not limited for this disclosure.

One specific example of embodiments will be illustrated below with reference to FIGS. 3 and 4.

Figure 3:
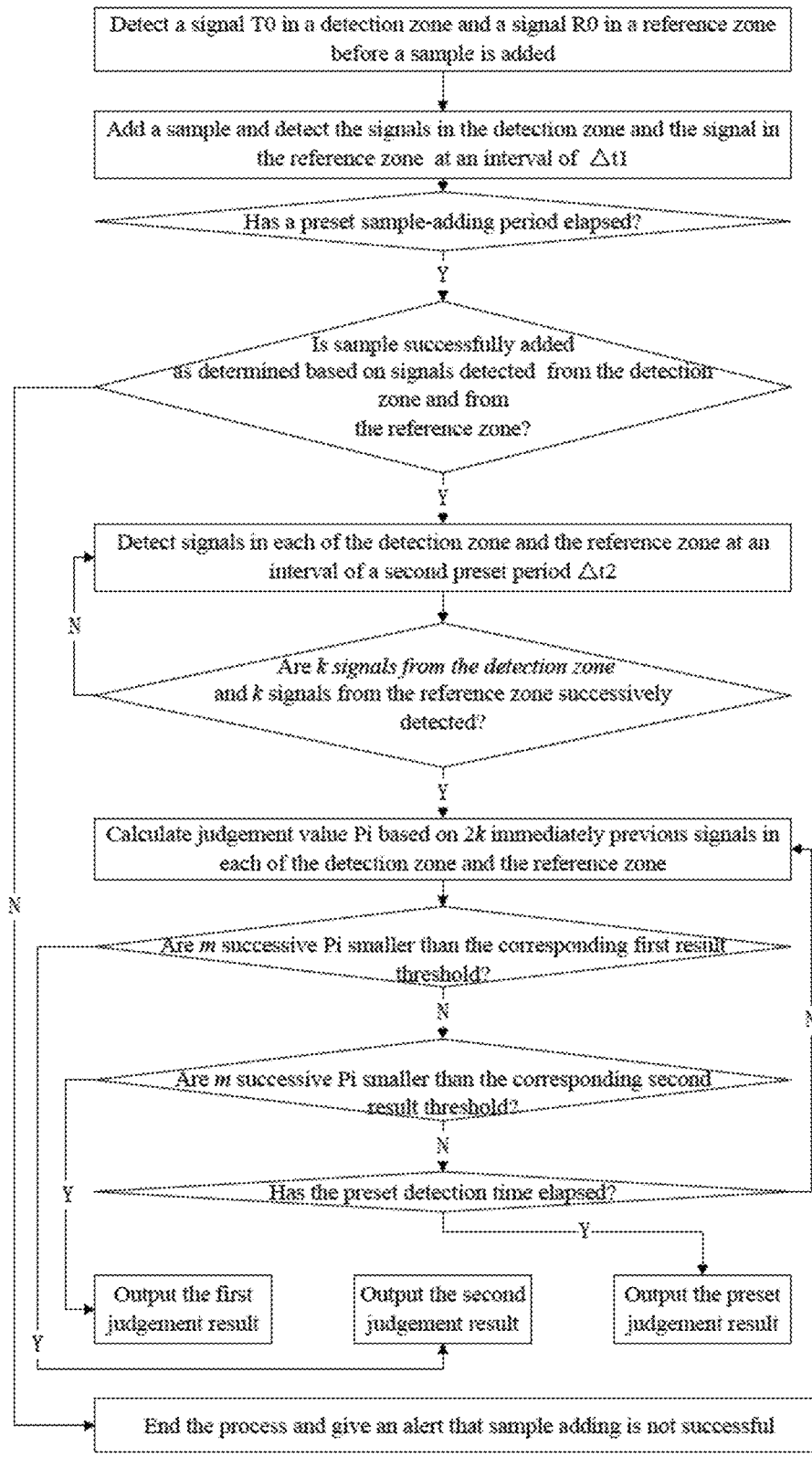
FIG. 3 schematically shows a flow chart of the process of electronic detection and determination in a specific example.
Figure 4:
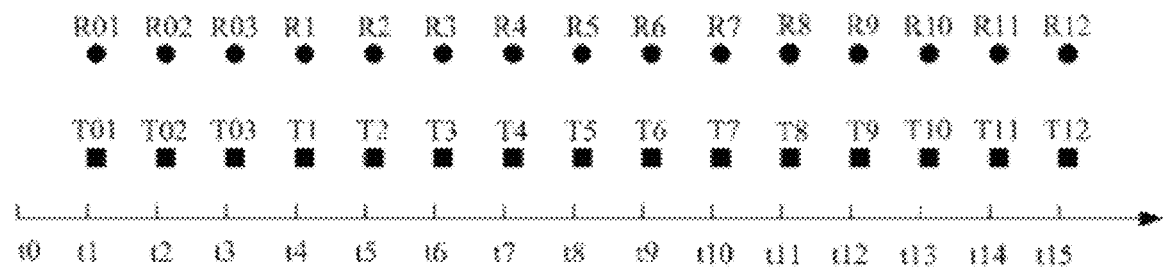
FIG. 4 schematically shows signal sequences detected from the detection zone and the reference zone in a specific example.

FIG. 3 schematically shows a flow chart of the process of electronic detection and determination in a specific example, and FIG. 4 schematically shows signal sequences detected from the detection zone and the reference zone in a specific example.

As shown in FIGS. 3 and 4, when an analyte detection analysis is performed with an electronic analysis apparatus, a signal T0 in a detection zone and a signal R0 in a reference zone are detected before a sample is added.

After a sample is added, the signals in the detection zone and the signal in the reference zone are detected at an interval of a first preset period Δt1 until a preset sample-adding period elapses. As shown in FIG. 4, assume that, during the preset sample-adding period after a sample is added, 3 signals designated as T01, T02, and T03 are collected from the detection zone and 3 signals designated as R01, R02, and R03 are collected from the reference zone, respectively.

Then, when the preset sample-adding period elapses, it is determined whether the sample is successfully added based on the detected signals T01, T02, and T03 from the detection zone and R01, R02, and R03 from the reference zone. Such judgement can be made with the following approach:

calculating ΔT as ΔT=Tmax−Tmin and ΔR as ΔR=Rmax−Rmin, whereas Tmax represents a maximum value of the signals in the detection zone detected during the preset sample-adding period after the sample is added, and specifically in this example embodiment, the maximum value of T01, T02, and T03;

Tmin represents a minimum value of the signals in the detection zone detected during the preset sample-adding period after the sample is added, and specifically in this example embodiment, the minimum value of T01, T02, and T03;

Rmax represents a maximum value of the signals in the reference zone detected during the preset sample-adding period after the sample is added, and specifically in this example embodiment, the maximum value of R01, R02, and R03;

Rmin represents a minimum value of the signals in the reference zone detected during the preset sample-adding period after the sample is added, and specifically in this example embodiment, the minimum value of R01, R02, and R03.

After ΔT and ΔR are obtained as above, ΔT and ΔR may be compared with the corresponding preset detection-zone threshold and preset reference-zone threshold, respectively. If ΔT is greater than or equal to the preset detection-zone threshold and ΔR is greater than or equal to the preset reference-zone threshold, then it is determined that the sample is successfully added. Otherwise, it is determined that the sample is not successfully added and an alert is given, indicating the same.

After it is determined that the sample is successfully added, the signals are detected in each of the detection zone and the reference zone at an interval of a second preset period Δt2. As shown in FIG. 4, the signals detected from the detection zone after it is determined that the sample is successfully added are designated as T1, T2, T3, . . . T12 . . . , and so on, while the signals detected from the reference zone after it is determined that the sample is successfully added are designated as R1, R2, R3, . . . R12 . . . , and so on. Δt2 and Δt1 can be set to be the same or different.

In this embodiment, assume that k is set to be 3, then, when 2k signals are detected from each of the detection zone and the reference zone for the first time at the time t9, a judgement value is calculated using the above Equation (1) or (2), designated as P1.

Then, the detection of signals in each of the detection zone and the reference zone is continued at an interval of a second preset period Δt2. When another set of k signals from the detection zone and k signals from the reference zone is detected, i.e., at the time t12, a judgement value is calculated using the above Equation (1) or (2), designated as P2.

When the m value is set as 2, a judgement result can be determined based on P1 and P2 at this time:

determining whether both P1 and P2 are smaller than a first result threshold corresponding to the time t12 and, if true, outputting a corresponding first judgement result;

determining whether both P1 and P2 are smaller than a second result threshold corresponding to the time t12 and, if true, outputting a corresponding second judgement result; and continuing the above detection process if either of P1 and P2 is greater than the first result threshold but smaller than the second result threshold, and, when another set of k signals from the detection zone and k signals from the reference zone is detected, i.e., at the time t15, calculating a judgement value using the above Equation (1) or (2), designated as P3.

As the m value is set as 2, a judgement result can be determined based on P2 and P3 at this time:

determining whether both P2 and P3 are smaller than a first result threshold corresponding to the time t15 and, if true, outputting a corresponding first judgement result;

determining whether both P2 and P3 are smaller than a second result threshold corresponding to the time t15 and, if true, outputting a corresponding second judgement result; and continuing the above detection process if either of P2 and P3 is greater than the first result threshold but smaller than the second result threshold until the first or second judgement result is output or until the preset detection time elapses.

When the preset detection time has elapsed, if at least one of two successive Pi is still greater than the first result threshold but smaller than the second result threshold, then a preset judgement result is output, which may be the first judgement result, the second judgement result, or any other judgement result as set, such as "detection failure", without being limited for the purpose of this disclosure.

In addition, the first and second result thresholds may be set as different values at different time points, i.e., such thresholds may vary with time. In a specific setting, the first and second result thresholds of different time points may also be set as different values from each other. However, the same values may be used for first and second result thresholds at different time points.

Figure 5:
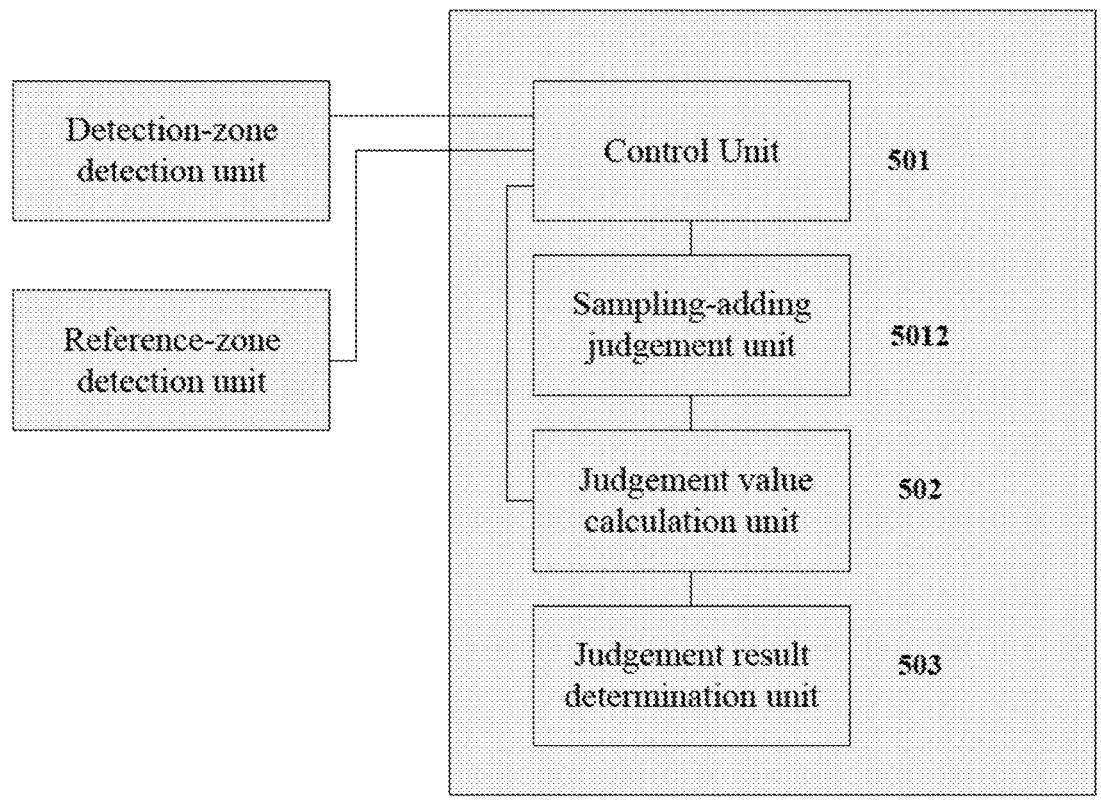
FIG. 5 schematically shows a structural configuration view of the apparatus for electronic detection and determination according to the present disclosure.

The present disclosure further provides an apparatus for electronic detection and determination based on the same conception as the method for electronic detection and determination above. FIG. 5 schematically shows a structural configuration view of the apparatus for electronic detection and determination according to the present disclosure.

As shown in FIG. 5, the apparatus for electronic detection and determination of this embodiment comprises:

a control unit 501, configured to control a detection-zone detection unit to detect a signal T0 in a detection zone and control a reference-zone detection unit to detect a signal R0 in a reference zone before a sample is added, and configured to control the detection-zone detection unit to detect the signal in the detection zone and control the reference-zone detection unit to detect the signal in the reference zone at an interval of a second preset period after the sample is added;

a judgement value calculation unit 502, configured to calculate a judgement value based on k immediately previous signals in each of the detection zone and the reference zone, the signal T0 in the detection zone before the sample is added, and the signal R0 in the reference zone before the sample is added, each time when 2k successive signals are detected in each of the detection zone and the reference zone;

a judgement result determination unit 503, configured to determine a judgement result based on m successive judgement values and a preset result threshold corresponding to a current detection time.

The embodiments of the present disclosure as above takes into account potential unstable factors during the reaction process of a test strip, such as light intensity, electric voltage, mobility of colloidal gold during chromatographic process, and provides a determination result by performing determination for multiple times after a sample is successfully added, ensuring the accuracy of the results and improving the accuracy of electronic analytical determination.

In one of the embodiments, as shown in FIG. 5, the apparatus for electronic detection and determination of this embodiment further comprises a sampling-adding judgement unit 5012;

the control unit 501 is further configured to, after the sample is added and before a judgement that sample is successfully added is made, control the detection-zone detection unit to detect the signal in the detection zone and control the reference-zone detection unit to detect the signal in the reference zone at an interval of a first preset period, and configured to, after the judgement that sample is successfully added is made by the sampling-adding judgement unit 5012, control the detection-zone detection unit to detect the signal in the detection zone and control the reference-zone detection unit to detect the signal in the reference zone at an interval of a second preset period; and the sampling-adding judgement unit 5012 is configured to, determine whether the sample is successfully added based on the signals detected in the detection zone and the reference zone after a preset sample-adding period elapses.

The judgement whether sample is successfully added can be by the sampling-adding judgement unit 5012 with the following approach:

making a judgement that sample is successfully added when a difference between a maximum value and a minimum value of the signals in the detection zone detected during the preset sample-adding period is greater than or equal to a preset detection-zone threshold while a difference between a maximum value and a minimum value of the signals in the reference zone detected during the preset sample-adding period is greater than or equal to a preset reference-zone threshold; and accordingly, making a judgement that sample is not successfully added and an alert is provided when a difference between a maximum value and a minimum value of the signals in the detection zone detected during the preset sample-adding period is smaller than a preset detection-zone threshold while a difference between a maximum value and a minimum value of the signals in the reference zone detected during the preset sample-adding period is smaller than a preset reference-zone threshold.

The sampling-adding judgement unit 5012 can calculate a judgement value with either of the following equations:

$$P_i = \sum_{n=i*k+1}^{(i+1)*k} \frac{Rn}{R0} \bigg/ \frac{Tn}{T0} - \sum_{n=(i-1)*k+1}^{i*k} \frac{Rn}{R0} \bigg/ \frac{Tn}{T0}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right)$$

whereas Pi represents the judgement value, i represents an $i^{th}$ set consisting of k signals from each of the detection zone and the reference zone, Rn represents an $n^{th}$ signal from the reference zone, and Tn represents an $n^{th}$ signal from the detection zone.

When the judgement value Pi is obtained, the judgement result determination unit determines a judgement result based on m successive judgement values and a preset result threshold corresponding to a current detection time. In one of the embodiments, the process may perform one of the following steps for this purpose:

outputting a first judgement result corresponding to the first corresponding result threshold, if the m successive judgement values are all smaller than the first corresponding result threshold;

outputting a second judgement result corresponding to the second corresponding result threshold, if the m successive judgement values are all greater than the second corresponding result threshold; and outputting a preset judgement result if at least one of the m successive judgement values is greater than the first corresponding result threshold but smaller than the second corresponding result threshold.

The preset judgement result herein may be either one of the first and second judgement results, or a third judgment result that is neither of the first and second judgement results, which is not limited for this disclosure.

The detection-zone detection unit and reference-zone detection unit shown in FIG. 5 may be implemented using known equipments in the art, provided that such equipments may control the units to generate corresponding detection-zone signals and reference-zone signals.

The detailed embodiments described herein are only for the purpose of illustrating the present invention, and are not intended to limit the scope of the present invention in any way. It would be understand by a person skilled in the art that various changes and modifications can be made to the embodiments described herein without departing from the scope and spirit of the present invention. Such changes and modifications are contemplated by the present invention, the scope of which should only be defined by the following claims.

What is claimed is:

1. A method for electronic detection and determination, comprising:

inserting a test strip with a detection zone and a reference zone into an electronic analyzer;

detecting with the electronic analyzer a signal T0 in the detection zone of the test strip and detecting a signal R0 in the reference zone of the test strip before a sample is added;

adding a sample to the test strip to cause a reaction on the test strip;

scanning with the electronic analyzer the test strip in real time while the reaction is still taking place on the test strip;

detecting with the electronic analyzer a subsequent signal in each of the detection zone of the test strip and the reference zone of the test strip at an interval of a second preset period after adding the sample to the test strip;

calculating with the electronic analyzer a judgement value based on a number of immediately previous signals in each of the detection zone and the reference zone, the signal T0 in the detection zone before the sample is added to the test strip, and the signal R0 in the reference zone before the sample is added to the test strip, each time when a number of successive signals are detected in each of the detection zone and the reference zone, the number of successive detections being k and the number of the immediately previous signals being 2k;

determining with the electronic analyzer a judgement result based on a number of successive judgement values and a preset result threshold corresponding to a current detection time, the number of the successive judgement values being m; and compensating with the electronic analyzer for potential unstable factors during the reaction process on the test strip; and providing the judgement result by performing determination for multiple times while the test strip is in the electronic analyzer after the sample is added to the test strip while the reaction process occurs to reaction stabilization in order to ensure accuracy of the result and improve accuracy of electronic analytical determination from the electronic analyzer.

2. The method for electronic detection and determination of claim 1, after the sample is added to the test strip and before detecting the signals in each of the detection zone of the test strip and the reference zone of the test strip at an interval of the second preset period:

detecting with the electronic analyzer the signal in the detection zone and the signal in the reference zone at an interval of a first preset period;

determining with the electronic analyzer whether the sample is successfully added based on the signals detected in the detection zone and the reference zone after a preset sample-adding period elapses; and detecting with the electronic analyzer the signals in each of the detection zone and the reference zone at an interval of a second preset period if the sample is successfully added.

3. The method for electronic detection and determination of claim 2, determining with the electronic analyzer that the sample is successfully added, when a difference between a maximum value and a minimum value of the signals in the detection zone detected during the preset sample-adding period is greater than or equal to a preset detection-zone threshold while a difference between a maximum value and a minimum value of the signals in the reference zone detected during the preset sample-adding period is greater than or equal to a preset reference-zone threshold;

or determining with the electronic analyzer that the sample is not successfully added is made and providing an alert, when a difference between a maximum value and a minimum value of the signals in the detection zone detected during the preset sample-adding period is smaller than a preset detection-zone threshold while a difference between a maximum value and a minimum value of the signals in the reference zone detected during the preset sample-adding period is smaller than a preset reference-zone threshold.

4. The method for electronic detection and determination of claim 1, wherein the judgement value is calculated with either of the following equations:

$$P_i = \sum_{n=i*k+1}^{(i+1)*k} \frac{Rn}{R0} \bigg/ \frac{Tn}{T0} - \sum_{n=(i-1)*k+1}^{i*k} \frac{Rn}{R0} \bigg/ \frac{Tn}{T0} \text{ and}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right);$$

whereas Pi represents the judgement value, i represents a $i^{th}$ set consisting of k signals from each of the detection zone and the reference zone, Rn represents a $n^{th}$ signal from the reference zone, and Tn represents a $n^{th}$ signal from the detection zone.

5. The method for electronic detection and determination of claim 1, wherein the corresponding preset result threshold comprises a first corresponding result threshold and a second corresponding result threshold, and wherein the determining the judgement result by the second section of the electronic analyzer for judgement result determination based on the m successive judgement values and the preset result threshold corresponding to the current detection time comprises:

outputting a first judgement result corresponding to the first corresponding result threshold, if the m successive judgement values are all smaller than the first corresponding result threshold;

outputting a second judgement result corresponding to the second corresponding result threshold, if the m successive judgement values are all greater than the second corresponding result threshold; and outputting a preset judgement result if at least one of the m successive judgement values is greater than the first corresponding result threshold but smaller than the second corresponding result threshold after a preset detection period elapses.

6. The method for electronic detection and determination of claim 2, wherein the corresponding preset result threshold comprises a first corresponding result threshold and a second corresponding result threshold, and the electronic analyzer is further configured for:

outputting a first judgement result corresponding to the first corresponding result threshold, if the m successive judgement values are all smaller than the first corresponding result threshold;

outputting a second judgement result corresponding to the second corresponding result threshold, if the m successive judgement values are all greater than the second corresponding result threshold; and outputting a preset judgement result if at least one of the m successive judgement values is greater than the first corresponding result threshold but smaller than the second corresponding result threshold after a preset detection period elapses.

7. The method for electronic detection and determination of claim 3, wherein the judgement value is calculated with either of the following equations:

$$P_i = \sum_{n=i*k+1}^{(i+1)*k} \frac{Rn}{R0} \bigg/ \frac{Tn}{T0} - \sum_{n=(i-1)*k+1}^{i*k} \frac{Rn}{R0} \bigg/ \frac{Tn}{T0} \text{ and}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right);$$

whereas Pi represents the judgement value, i represents a $i^{th}$ set consisting of k signals from each of the detection zone of the test strip and the reference zone of the test strip, Rn represents a $n^{th}$ signal from the reference zone of the test strip, and Tn represents a $n^{th}$ signal from the detection zone of the test strip.

8. The method for electronic detection and determination of claim 3, wherein the corresponding preset result threshold comprises a first corresponding result threshold and a second corresponding result threshold, and the electronic analyzer is further configured for:

outputting a first judgement result corresponding to the first corresponding result threshold, if the m successive judgement values are all smaller than the first corresponding result threshold;

outputting a second judgement result corresponding to the second corresponding result threshold, if the m successive judgement values are all greater than the second corresponding result threshold; and outputting a preset judgement result if at least one of the m successive judgement values is greater than the first corresponding result threshold but smaller than the second corresponding result threshold after a preset detection period elapses.

9. An apparatus for electronic detection and determination, comprising:

a test strip with only two zones a detection zone and a reference zone;

an electronic analyzer for inserting the test strip thereto;

the electronic analyzer having a slot for inserting the test strip;

a sample added to the test strip to cause a reaction on the test strip;

a circuitry of the electronic analyzer for scanning the test strip in real time while the reaction is still taking place on the test strip;

the electronic analyzer compensates for potential unstable factors during the reaction process on the test strip and performs multiple determinations after the sample is added to the test strip while the reaction process occurs to reaction stabilization in order to ensure accuracy of a result and improve accuracy of electronic analytical determination from the electronic analyzer; and the circuitry further performs the functions of:

controlling a detection-zone detector to detect a signal T0 in the detection zone of the test strip and controlling a reference-zone detector to detect a signal R0 in the reference zone of the test strip before a sample is added to the test strip, and the electronic analyzer further configured to control the detection-zone detector to detect a subsequent signal in the detection zone of the test strip and control the reference-zone detector to detect the signal in the reference zone of the test strip at an interval of a second preset period after the sample is added is detected;

calculating a judgement value based on a number of immediately previous signals in each of the detection zone and the reference zone, the signal T0 in the detection zone before the sample is added, and the signal R0 in the reference zone before the sample is added, each time when a number of successive signals are detected in each of the detection zone and the reference zone, the number of successive detections being k and the number of the immediately previous signals being 2k; and determining a judgement result based on a number of successive judgement values and a preset result threshold corresponding to a current detection time, the number of successive judgement values being m.

10. The apparatus for electronic detection and determination of claim 9, wherein the electronic analyzer is configured for determining a sampling-adding judgement, and the electronic analyzer is further configured to, after the sample is added and before the sample is successfully added is detected, control the detection-zone detector to detect the signal in the detection zone of the test strip and control the reference-zone detector to detect the signal in the reference zone of the test strip at an interval of a first preset period, and configured to, after the judgement that sample is successfully added is made by the electronic analyzer, control the detection-zone detector to detect the signal in the detection zone of the test strip and control the reference-zone detector to detect the signal in the reference zone of the test strip at an interval of a second preset period; and the electronic analyzer is further configured to determine whether the sample is successfully added based on the signals detected in the detection zone of the test strip and the reference zone of the test strip after a preset sample-adding period elapses.

11. The apparatus for electronic detection and determination of claim 10, wherein the electronic analyzer is further configured to determine whether the sample is successfully added when a difference between a maximum value and a minimum value of the signals in the detection zone of the test strip detected during the preset sample-adding period is greater than or equal to a preset detection-zone threshold while a difference between a maximum value and a minimum value of the signals in the reference zone of the test strip detected during the preset sample-adding period is greater than or equal to a preset reference-zone threshold;

or that the sample is not successfully added and an alert is provided, when a difference between a maximum value and a minimum value of the signals in the detection zone of the test strip detected during the preset sample-adding period is smaller than a preset detection-zone threshold while a difference between a maximum value and a minimum value of the signals in the reference zone of the test strip detected during the preset sample-adding period is smaller than a preset reference-zone threshold.

12. The apparatus for electronic detection and determination of claim 9, wherein the judgement value is calculated with either of the following equations:

$$P_i = \sum_{n=i*k+1}^{(i+1)*k} \frac{Rn}{R0} \Big/ \frac{Tn}{T0} - \sum_{n=(i-1)*k+1}^{i*k} \frac{Rn}{R0} \Big/ \frac{Tn}{T0} \text{ and}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right);$$

whereas Pi represents the judgement value, i represents an $i^{th}$ set consisting of k signals from each of the detection zone and the reference zone, Rn represents an $n^{th}$ signal from the reference zone of the test strip, and Tn represents an $n^{th}$ signal from the detection zone of the test strip.

13. The apparatus for electronic detection and determination of claim 9, wherein the corresponding preset result threshold comprises a first corresponding result threshold and a second corresponding result threshold, and the electronic analyzer is further configured for:
   outputting a first judgement result corresponding to the first corresponding result threshold, if the m successive judgement values are all smaller than the first corresponding result threshold;
   outputting a second judgement result corresponding to the second corresponding result threshold, if the m successive judgement values are all greater than the second corresponding result threshold; and
   outputting a preset judgement result if at least one of the m successive judgement values is greater than the first corresponding result threshold but smaller than the second corresponding result threshold.

14. The method for electronic detection and determination of claim 2, wherein the judgement value is calculated with either of the following equations:

$$P_i = \sum_{n=i*k+1}^{(i+1)*k} \frac{Rn}{R0} \Big/ \frac{Tn}{T0} - \sum_{n=(i-1)*k+1}^{i*k} \frac{Rn}{R0} \Big/ \frac{Tn}{T0} \text{ and}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right);$$

whereas Pi represents the judgement value, i represents a $i^{th}$ set consisting of k signals from each of the detection zone and the reference zone, Rn represents a $n^{th}$ signal from the reference zone of the test strip, and Tn represents a $n^{th}$ signal from the detection zone of the test strip.

15. The apparatus for electronic detection and determination of claim 13, wherein the judgement value is calculated with either of the following equations:

$$P_i = \sum_{n=i*k+1}^{(i+1)*k} \frac{Rn}{R0} \Big/ \frac{Tn}{T0} - \sum_{n=(i-1)*k+1}^{i*k} \frac{Rn}{R0} \Big/ \frac{Tn}{T0} \text{ and}$$

$$Pi = \sum_{n=i*k+1}^{(i+1)*k} \left(\frac{Rn}{R0} - \frac{Tn}{T0}\right) - \sum_{n=(i-1)*k+1}^{i*k} \left(\frac{Rn}{R0} - \frac{Tn}{T0}\right);$$

whereas Pi represents the judgement value, i represents an $i^{th}$ set consisting of k signals from each of the detection zone of the test strip and the reference zone of the test strip, Rn represents an $n^{th}$ signal from the reference zone of the test strip, and Tn represents an $n^{th}$ signal from the detection zone of the test strip.

* * * * *